United States Patent [19]

Tanaka et al.

[11] 4,358,508
[45] Nov. 9, 1982

[54] PROCESS FOR FORMING COATING FILM

[75] Inventors: Hiroyuki Tanaka; Fumito Aosai; Koichiro Kido; Shogo Yamamoto, all of Nagoya, Japan

[73] Assignee: Mitsubishi Rayon Co., Ltd., Tokyo, Japan

[21] Appl. No.: 243,062

[22] Filed: Mar. 12, 1981

[30] Foreign Application Priority Data

Mar. 19, 1980 [JP] Japan ................................. 55-35425

[51] Int. Cl.$^3$ ............................................. B32B 15/08
[52] U.S. Cl. ................................ 428/458; 427/202; 427/409; 427/195; 428/461
[58] Field of Search .................... 427/202, 195, 409; 428/461, 458, 463

[56] References Cited

U.S. PATENT DOCUMENTS

| | | | |
|---|---|---|---|
| 3,953,644 | 3/1976 | Camelon | 427/195 |
| 4,142,018 | 2/1979 | Ozawa | 427/409 |
| 4,220,679 | 9/1980 | Blackhouse | 427/401 |

FOREIGN PATENT DOCUMENTS

| | | | |
|---|---|---|---|
| 55-11028 | 1/1980 | Japan | 427/202 |
| 2012191 | 7/1979 | United Kingdom | 427/195 |
| 2055626 | 3/1981 | United Kingdom | 427/409 |

*Primary Examiner*—Sam Silverberg
*Attorney, Agent, or Firm*—Oblon, Fisher, Spivak, McClelland & Maier

[57] ABSTRACT

A process for forming a coating film comprising coating, onto a substrate, a solvent type coating material prepared by blending a color pigment or combination of a metallic powder and a color pigment into base resin (A) containing a carboxylic acid amide copolymer as main component, then coating a transparent thermosetting powder coating material thereon, and thereafter heating and curing them.

3 Claims, No Drawings

PROCESS FOR FORMING COATING FILM

This invention relates to a process for forming coating films applicable to uses requiring a high class of appearance such as overcoating material for automobile and the like.

Since powder coating materials have various merits such that they are solventless which is desirable from the viewpoint of environmental protection, that a thick coating film having a thickness of 50μ or above can be produced therefrom by only one time of coating, that the powder coating material not adhered to substrate is easy to recover which yields only a small loss of coating material and is economical, and so on, the use of powder coating materials is rapidly expanding. However, when a powder coating material is used as an enamel and particularly as an overcoating metallic enamel for automobiles, namely when a metallic powder or combination of a metallic powder and a color pigment is mixed into a powder coating resin composition, it is yet quite difficult to obtain the same metallic feeling as in the hitherto known solvent type metallic coating materials by the electrostatic spray coating process due to the insufficient orientation of metallic powder in coating film caused by the difference in the quantity of electric charge between metallic powder and powder coating resin and the high melt viscosity of powder coating material, so that it is not yet practically employed. Apart from above, powder enamel has many problems also in point that the procedure of color changeover is quite complicated, including the case of using a powder enamel as a solid base. In order to solve these problems, 2-coat 1-bake finishing process is extensively studied at the present stage which comprises coating a usual thermosetting solvent type coating material (base coating material) containing a color pigment or combination of a color pigment and a metallic powder as enamel base, then overcoating a thermosetting transparent powder coating material (clear coating material) by the dry-on-wet method and finally heat-curing it. However, when a usual thermosetting solvent type coating material is used as a base coating material, various abnormalities of coating film, such as pin hole, surface roughening, metallic unevenness, etc., take place probably due to the residual solvent in coating film and the by-product of the thermosetting reaction, which are laborious to cope with. Particularly when these systems are applied to coating line of automobiles, there arises a problem in the coating workability at the time of repair. That is, if a defect is found out after coating a solvent type base coating material, overcoating a powder clear coating material thereon and baking it, the coating with the solvent type base coating material, the overcoating with the powder clear coating material and the baking have to be repeated again, which yields a very thick coating film and is apt to cause pin holes, surface roughening, etc. Therefore, a base coating material particularly excellent in workability and finish is necessary.

Further, as a demand of market and in relation to the automobile coating line, the clear coating material to be coated over the solvent type base coating material is a usual solvent type clear coating material in some cases and a thermosetting powder clear coating material in some other cases. In the case of usual solvent type clear coating material, it must be baked at 140°–150° C. for about 20–30 minutes, while in the case of powder clear coating material a baking at 160°–170° C. for about 20–30 minutes is necessary. Therefore, the base coating material put to this use is required to form a coating film of good performance, whether powder clear coating material or solvent type clear coating material is used.

The present inventors conducted earnest studies with the aim of solving these problems and, as the result, achieved this invention. Thus, this invention provides a process for forming a coating film which comprises coating, onto a substrate, a solvent type coating material prepared by blending a color pigment or combination of a metallic powder and a color pigment into a base resin containing a carboxylic acid amide copolymer as main component, then overcoating a transparent thermosetting powder coating material thereon, and thereafter heating and curing them.

By employing the process of this invention, the above-mentioned pin hole, surface roughening, etc. can be prevented and a coating film having good performances can be formed.

The base resin A of this invention contains, as its main component, a carboxylic acid amide copolymer which will be detailed below. As the resin to be blended therewith, cellulose acetate butyrate resin, polyester resin, amino resin and the like are preferable.

As the components for forming said carboxylic acid amide copolymer, α,β-monoethylenic unsaturated carboxylic acid amides, N-alkoxyalkyl-substituted amides, α,β-unsaturated carboxylic acids having one or more carboxyl groups, hydroxyalkyl α,β-unsaturated carboxylates, unsaturated polyester resins, unsaturated monomers having glycidyl group, other copolymerizable unsaturated monomers and the like can be referred to.

As said α,β-monoethylenic unsaturated carboxylic acid amide, acrylamide or methacrylamide is preferably used. However, other copolymerizable unsaturated carboxylic acid amides can also be used, of which examples include itaconic acid diamide, α-ethylacrylamide, crotonic acid amide, fumaric acid diamide, maleic acid diamide and other α,β-ethylenic unsaturated carboxylic acid amides having at most about 10 carbon atoms. Said unsaturated carboxylic acid amide is used in an amount of 2–20% by weight and preferably 5–15% by weight based on the carboxylic acid amide copolymer. If it is less than 2% by weight, the cure is insufficient and the cured product is unsatisfactory in solvent resistance. If it is larger than 20% by weight, blister easily takes place and coating film becomes insufficient in flexibility, which is undesirable. The carboxylic acid amide copolymer preferably used in this invention is a product obtained by modifying a carboxylic acid amide with an aldehyde and then etherifying it at least partially. The etherification is carried out by the use of an alcohol.

In this carboxylic acid amide copolymer, it is necessary that one hydrogen atom of the amide group is substituted by a group represented by the following formula:

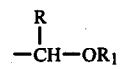

wherein R represents hydrogen atom when formaldehyde is used and represents alkyl group when other aliphatic aldehyde is used, and $R_1$ represents hydrogen atom or a residue obtained by subtracting hydroxyl group from the alcohol used for the etherification, i.e. an organic group such as alkyl group or aryl group. When the etherification is insufficient, problems are apt to arise in point of storage stability. As the alcohol used for the etherification, monohydric alcohols such as methanol, ethanol, propanol, pentanol and other alkanols having at most about 8 carbon atoms can be used, among which butanol and isobutanol are preferable. As alternative processes for producing the preferable carboxylic acid amide copolymer of this invention, a process which comprises carrying out the copolymerization by the use of an amide modified with an aldehyde such as alkylolamide in stead of said unsaturated carboxylic acid amide and then etherifying the copolymer or a process which comprises carrying out the copolymerization by the use of a N-alkoxyalkyl-substituted amide from the beginning can be referred to. Said N-alkoxyalkyl-substituted amide is represented by the following structural formula:

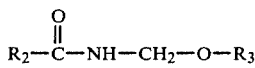

$$R_2-\overset{\overset{O}{\|}}{C}-NH-CH_2-O-R_3$$

wherein $R_2$ represents aliphatic hydrocarbon group having 2–6 carbon atoms and a single, polymerizable, α,β-ethylenic, unsaturated, terminal group, and $R_3$ represents lower alkyl group having 1–8 carbon atoms. The process for producing these substituted amides is mentioned in U.S. Pat. No. 3,079,434. Concrete examples of said N-alkoxyalkyl-substituted amide include N-methoxymethyl-(meth)acrylamide, N-ethoxyethyl-(meth)-acrylamide, N-butoxymethyl-(meth)acrylamide, N-isobutoxymethyl-(meth)acrylamide and the like. It is used in an amount of 4–40% by weight and preferably 10–30% by weight based on the carboxylic acid amide copolymer.

As said α,β-unsaturated carboxylic acid having one or more carboxyl group(s), acrylic acid, methacrylic acid, itaconic acid, maleic acid, fumaric acid, their monoalkyl esters, α-methyleneglutaric acid, aconitic acid, atropic acid, acid anhydride adducts of hydroxyalkyl esters of α,β-unsaturated carboxylic acids and the like can be referred to. It is used in an amount of 0.5–10% by weight and preferably 1–7% by weight. These acids not only play an important role as a catalyst for the crosslinking reaction of the carboxylic acid amide copolymer, but also the acid itself functions as a crosslinking group and exhibits a great effect upon the affinity and adhesion to pigment. However, when the amount of said α,β-unsaturated carboxylic acid is less than 0.5% by weight, the above-mentioned effects are insufficient. When the amount is larger than 10% by weight, the viscosity of the carboxylic acid amide copolymer obtained becomes high and its performances such as water resistance are deteriorated.

As said hydroxyalkyl α,β-unsaturated carboxylate, 2-hydroxyethyl acrylate, 2-hydroxypropyl acrylate, 3-hydroxypropyl acrylate, 4-hydroxybutyl acrylate, 5-hydroxyamyl acrylate, 6-hydroxyhexyl acrylate, 7-hydroxyheptyl acrylate, 9-hydroxynonyl acrylate, 10-hydroxydecyl acrylate, 2-hydroxyethyl methacrylate, 2-hydroxypropyl methacrylate, 3-hydroxypropyl methacrylate, 6-hydroxyhexyl methacrylate, 8-hydroxyoctyl methacrylate, 10-hydroxydecyl methacrylate, 3-hydroxypropyl crotonate, 5-hydroxyamyl crotonate, 6-hydroxyhexyl crotonate, 7-hydroxyheptyl crotonate, 10-hydroxydecyl crotonate, di(2-hydroxyethyl) maleate, di(4-hydroxybutyl) maleate, di(6-hydroxyhexyl) maleate, di(9-hydroxynonyl) maleate, di(10-hydroxydecyl) maleate, di(2-hydroxyethyl) fumarate, di(4-hydroxybutyl) fumarate, di(6-hydroxyhexyl) fumarate, di(10-hydroxydecyl) fumarate and the like can be referred to. Further, other substituents, including secondary hydroxyl group, halide group, nitrile group and analogous groups, may be introduced into the alkyl chain. Examples of such derivatives include 2,3-hydroxypropyl acrylate, 3,5-dihydroxyamyl crotonate, 6,10-dihydroxydecyl methacrylate di(2-chloro-7-hydroxyheptyl) fumarate and the like.

The hydroxyalkyl α,β-unsaturated carboxylates are reactive with the carboxylic acid amide in the copolymer, and at the same time reactive with crosslinking agent such as melamine resin or the like if it is used. Therefore, it forms a good coating film at a lower temperature than in the case that said hydroxyalkyl α,β-unsaturated carboxylate is not contained. The kind and amount of said crosslinking agent should be selected carefully with consideration of prevention of pin hole, surface roughening, etc. Said hydroxyalkyl α,β-unsaturated carboxylate is used in an amount of 1–15% by weight and preferably 3–12% by weight. If it is less than 1% the curability at low temperature is deteriorated. If it is larger than 15%, curing progresses too speedily so that bad appearance such as pin hole can take place or it can remain unreacted to result in a drop in water resistance, which are both undesirable.

Apart from above, the use of glycidyl group-containing unsaturated monomers such as glycidyl acrylate, glycidyl methacrylate, β-methylglycidyl acrylate, β-methylglycidyl methacrylate and the like is effective particularly when the adhesion between substrate and base coat is intensely desired, and its amount is preferably in the range of 0.5–5% by weight. If its amount is less than 0.5%, its use has no marked effect. If its amount exceeds 5%, the storage stability of the resin itself becomes worse, which is impractical.

The unsaturated polyester resin used in this invention is obtained by reacting a known polyhydric alcohol with a known polybasic carboxylic acid by the known process at an elevated temperature. As said unsaturated polyester resin, those containing 0.5–5% by weight of an ethylenic unsaturated compound having carboxyl group, epoxy group, hydroxyl group or amide group in its starting composition are preferable for the reason that they should give a preferable carboxylic acid amide copolymer when copolymerized with the unsaturated monomer used in the carboxylic acid amide copolymer of this invention. Examples of the polyhydric alcohol usable include ethylene glycol, diethylene glycol, neopentyl glycol, 1,6-hexanediol, 1,3-butylene glycol, 1,4-butylene glycol, bis(hydroxyethyl) terephthalate, hydrogenated Bisphenol A, trimethylolpropane, trimethylolethane, glycerin, pentaerythritol and the like. Examples of said polybasic carboxylic acid include phthalic acid (anhydride), isophthalic acid, terephthalic acid, trimellitic acid (anhydride), tetrahydrophthalic acid (anhydride), adipic acid, sebacic acid, azelaic acid, fumaric acid, maleic acid, benzoic acid, p-t-butylbenzoic acid, Versatic acid and the like. These unsaturated polyester resins are used for the purpose of improving the pigment dispersibility, pulverizability at the time of coating and low temperature curability of the solvent type coating material containing the carboxylic acid amide copolymer of this invention as a main component and forming a coating film having good finish appearance, and its molecular weight is preferably about 2,000–50,000 in terms of weight average molecular weight. It is used in an amount of 5–30% by weight, preferably.

As said other copolymerizable unsaturated monomer used in this invention, (meth)acrylic esters having $C_1$–$C_{18}$ alkyl group, vinyl-aromatic compounds such as styrene, α-methylstyrene, vinyltoluene and the like, organic nitriles such as acrylonitrile, methacrylonitrile and the like, vinyl esters of organic acids such as vinyl acetate, vinyl propionate and the like, esters of fumaric and maleic acids such as diethyl fumarate, dibutyl fumarate, diisopropyl maleate and the like, and esters of itaconic acid such as diethyl itaconate, dibutyl itaconate and the like can be referred to. Preferably, these unsaturated monomers are appropriately selected with consideration of the coating workability of the solvent type coating material containing carboxylic acid amide copolymer as a main component and the performances of the coating film.

The carboxylic acid amide copolymer of this invention can be obtained by copolymerizing the monomers in an organic solvent in the presence of a vinyl polymerization initiator. This process is well known and its examples are shown in, for example, U.S. Pat. Nos. 2,978,437, 3,079,434, 3,307,963 and 3,510,541.

It is suitable for the purpose of this invention that the base resin A of this invention contains 1–20 parts by weight of cellulose acetate butyrate resin per 100 parts by weight of carboxylic acid amide copolymer as the main component. This is for the reason that cellulose acetate butyrate exhibits an excellent effect on the prevention of blister and, when a metallic powder is used, on the orientation of metallic powder. If its amount is less than 1 part by weight, the above-mentioned effect cannot be expected. If it is larger than 20 parts by weight, the cost rises and performances such as water resistance become unsatisfactory. As said cellulose acetate butyrate resin, those having various characteristic values can be used. Usually, however, those having a degree of butyration of 30% or more are preferable. As commercial products conforming to such a condition, "EAB-381", "EAB-551" and the like of Eastman Kodak Co. can be referred to, among which EAB-551-02 is particularly preferable.

When base resin A of this invention is constituted of 30–94 parts by weight of carboxylic acid amide copolymer, 5–30 parts by weight of polyester resin, 1–20 parts by weight of cellulose acetate butyrate resin and 0–20 parts by weight of amino resin, this solvent type coating material exhibits good performances for the above-mentioned object. Said polyester resin is used for the purpose of improving the pigment dispersibility, pulverizability at the time of coating, low temperature curability, etc. and for forming a coating film having a good finish appearance. It is used in an amount of 5–30 parts by weight per 100 parts by weight of the solid content in base resin A. As polyester resin used for these purposes, those having good miscibility with the carboxylic acid amide copolymer and having a molecular weight of about 2,000–50,000 in terms of weight average molecular weight are preferable.

This polyester resin can be obtained by reacting a known polyhydric alcohol and a known polybasic carboxylic acid at an elevated temperature according to the well known process. Examples of the polyhydric alcohol usable include ethylene glycol, diethylene glycol, neopentyl glycol, 1,6-hexanediol, 1,3-butylene glycol, 1,4-butylene glycol bis(hydroxyethyl)terephthalate, hydrogenated Bisphenol A, trimethylolpropane, trimethylolethane, glycerin, pentaerythritol and the like. Examples of the polybasic carboxylic acid include phthalic acid (anhydride), isophthalic acid, terephthalic acid, trimellitic acid (anhydride), tetrahydrophthalic acid (anhydride), hexahydrophthalic acid (anhydride), adipic acid, sebacic acid, azelaic acid, fumaric acid, maleic acid, benzoic acid, p-t-butylbenzoic acid, Versatic acid and the like.

In base resin A, 1–20 parts by weight of cellulose acetate butyrate resin is used per 100 parts by weight of the solid content of base resin A. This is used for the same purpose as above, i.e. for preventing the pin hole and forming a coating film excellent in orientation of metallic powder when a metallic powder is used. If its amount is less than 1 part, its effect cannot be expected. If its amount is larger than 20 parts, the cost rises and performances such as water resistance become unsatisfactory.

Though base resin A mainly comprising the carboxylic acid amide of this invention is self-crosslinkable originally, it may also be used in combination with an amino resin. In such a case, however, said amino resin is preferably selected with consideration of the prevention of pin hole and surface roughening. Concrete examples of said amino resin include methylated melamine resin, butylated melamine resin, isobutylated melamine resin and the like. These amino resins are used for the purpose of improving the low temperature curability, and their amount is preferably 20 parts by weight or less per 100 parts by weight of the solid content in base resin A.

By adding a color pigment or combination of a metallic powder and a color pigment to base resin A of this invention comprising the carboxylic acid amide copolymer, the polyester resin, the cellulose acetate butyrate resin, the amino resin, etc. to give a base coating material, and carrying out a 2-coat 1-bake finishing which comprises coating the base coating material onto a primer formed by electrodeposition coating on a substrate, further coating a transparent thermosetting powder coating material thereon and baking them at 160°–170° C. for 20–30 minutes, a coating film free from defects such as pin hole, surface roughening, etc., having an excellent appearance and having a good adhesion to substrate can be formed.

A coating film good in both appearance and coating film performances can also be obtained by coating the substrate with a usual solvent type of acryl-melamine crosslinkable clear coating material in stead of the above-mentioned transparent thermosetting powder coating material and baking it at 140°–150° C. for 20–30 minutes.

As the transparent thermosetting powder coating material used as the clear coating material for 2-coat 1-bake finish, various types of powder coating materials extensively in use can be employed. For the overcoating of automobiles which is the main object of this invention, acrylic powder coating materials prepared by blending an acrylic copolymer resin comprising a vinyl monomer having glycidyl or hydroxyl group such as glycidyl methacrylate, glycidyl acrylate, hydroxyethyl acrylate or hydroxyethyl methacrylate as a functional monomer and alkyl acrylate, alkyl methacrylate, styrene or the like as a non-functional monomer with appropriate quantities of polybasic carboxylic acid, block isocyanate or the like as a curing agent component and further with appropriate quantities of coating surface regulator, anticissing agent and the like are particularly preferable, although polyester type coating materials can also be used.

In the following preparative examples and examples, "parts" means "parts by weight".

Preparative Example 1

Preparation of Carboxylic Acid Amide Copolymer 1

25 Parts of n-butanol, 75 parts of xylene, 10 parts of acrylamide, 40 parts of methyl methacrylate, 2.5 parts of methacrylic acid, 47.5 parts of ethyl acrylate, 1.5 parts of t-dodecylmercaptan and 1 part of cumene hydroperoxide were charged into a reaction vessel equipped with a stirrer, a thermometer, a cooler and a decanter. The mixture was heated to 100° C. in one hour and kept at 100° C. for 8 hours. While it was kept at this temperature, each 0.5 part of cumene hydroperoxide as a polymerization initiator was added three times at intervals of 2 hours.

Then, 20 parts of 40% solution of formaldehyde in n-butanol and 0.4 part of maleic anhydride were added, and the mixture was heated under reflux for 4 hours while removing water from the decanter. The carboxylic acid amide copolymer 1 thus obtained was a transparent and viscous liquid having a solid content of 50.5% and an acid number of 7.5.

Preparative Example 2

Preparation of Carboxylic Acid Amide Copolymer 2

25 Parts of n-butanol and 75 parts of xylene were charged into a reaction vessel equipped with a stirrer, a thermometer and a cooler, and heated to 100° C. Then, a mixture comprising 20 parts of N-butoxymethylacrylamide, 2 parts of acrylic acid, 30 parts of methyl methacrylate, 38 parts of ethyl acrylate, 10 parts of n-butyl acrylate and 1 part of benzoyl peroxide was added into this reaction vessel over a time period of 4 hours. After addition, each 0.2 part of benzoyl peroxide was three times added at intervals of one hour, and then the mixture was kept at 100° C. for 5 hours. The carboxylic acid amide copolymer 2 thus obtained was a transparent and viscous liquid having a solid content of 50.3% and an acid number of 8.5.

Preparative Example 3

Preparation of Carboxylic Acid Amide Copolymer 3

25 Parts of n-butanol, 75 parts of xylene, 10 parts of acrylamide, 5 parts of 2-hydroxyethyl methacrylate, 2 parts of glycidyl methacrylate, 33 parts of methyl methacrylate, 25 parts of methacrylic acid, 47.5 parts of ethyl acrylate, 1.5 parts of t-dodecylmercaptan, and 1 part of cumene hydroperoxide were charged into a reaction vessel equipped with a stirrer, a thermometer, a cooler and a decanter. The temperature of the mixture was elevated to 100° C. in one hour, and it was kept at this temperature for 8 hours, during which each 0.5 part of cumene hydroperoxide as a polymerization initiator was added three times at intervals of 2 hours.

Then, 20 parts of 40% solution of formaldehyde in n-butanol and 0.4 part of maleic anhydride were added, and the resulting mixture was heated under reflux for 4 hours while removing water from the decanter. The carboxylic acid amide copolymer 3 thus obtained was a transparent viscous liquid having a solid content of 50.5% and an acid number of 7.5.

Preparative Example 4

Preparation of Carboxylic Acid Amide Copolymer 4

25 Parts of n-butanol and 75 parts of xylene were charged into a reaction vessel equipped with a stirrer, a thermometer and a cooler, and the temperature of the mixture was elevated to 100° C.

Then, a mixture comprising 20 parts of N-methoxymethylmethacrylamide, 2 parts of acrylic acid, 5 parts of 2-hydroxyethyl methacrylate, 2 parts of glycidyl methacrylate, 23 parts of methyl methacrylate, 38 parts of ethyl acrylate, 10 parts of n-butyl acrylate and 1 part of benzoyl peroxide was added over a time period of 4 hours. After the addition, each 0.2 part of benzoyl peroxide was 3 times added at intervals of 1 hour, and the resulting mixture was kept at 100° C. for 5 hours. The carboxylic acid amide copolymer 4 thus obtained was a transparent viscous liquid having a solid content of 50.3% and an acid number of 8.5.

Preparative Example 5

Preparation of Unsaturated Polyester Resin A 1,080 Parts of isophthalic acid, 467 parts of adipic acid, 29 parts of maleic anhydride, 53.6 parts of trimethylolpropane, 832 parts of neopentyl glycol and 0.3 part of hydroquinone were charged into a reaction vessel equipped with a stirrer, a thermometer and a nitrogen gas inlet tube, and reacted at 220° C. while blowing nitrogen thereinto until the acid number reached 9. After cooling the reaction vessel, the mixture was diluted with a solvent mixture comprising n-butanol, butyl acetate and xylene (20/10/70, ratio by weight) so that the concentration of the solid component became 50%. The unsaturated polyester resin A thus obtained was a transparent viscous liquid having an acid number of 4.5.

Preparative Example 6

Preparation of Unsaturated Polyester Resin B 1,112 Parts of isophthalic acid, 482 parts of adipic acid, 26 parts of itaconic acid, 728 parts of neopentyl glycol, 90 parts of 1,4-butanediol, 536 parts of trimethylolpropane and 0.6 part of hydroquinone were charged into the same reaction vessel as above, and reacted while blowing nitrogen until the acid number of the mixture reached 10. After cooling the reaction vessel, the mixture was diluted with a solvent mixture comprising n-butanol, butyl acetate and xylene (20/10/70, ratio by weight) so that the concentration of solid component became 50%. The polyester resin B thus obtained was a transparent viscous liquid having an acid number of 5.

Preparative Example 7

Preparation of Carboxylic Acid Amide Copolymer 5

25 Parts of n-butanol, 65 parts of xylene, 10 parts of acrylamide, 30 parts of methyl methacrylate, 20 parts of unsaturated polyester resin A, 2.5 parts of methacrylic acid, 47.5 parts of ethyl acrylate, 1.5 parts of t-dodecylmercaptan and 1 part of cumene hydroperoxide were charged into a reaction vessel equipped with a stirrer, a thermometer, a cooler and a decanter. After elevating the temperature of the mixture to 100° C. in one hour, the mixture was kept at 100° C. for 8 hours.

Then, 20 parts of 40% solution of formaldehyde in n-butanol and 0.4 part of maleic anhydride were added, and the resulting mixture was heated under reflux for 4 hours while removing water from the decanter. The carboxylic acid amide copolymer 5 thus obtained was a transparent viscous liquid having a solid content of 50.5% and an acid number of 7.7.

Preparative Example 8

Preparation of Carboxylic Acid Amide Copolymer 6

25 Parts of n-butanol and 60 parts of xylene were charged into a reaction vessel equipped with a stirrer, a thermometer, a dropping funnel and a cooler, and the temperature of the mixture was elevated to 100° C. Then, a mixture comprising 20 parts of N-butoxymethylacrylamide, 2 parts of acrylic acid, 20 parts of methyl methacrylate, 30 parts of unsaturated polyester resin B, 38 parts of ethyl acrylate, 10 parts of n-butyl acrylate and 1 part of benzoyl peroxide was added into the reaction vessel over a time period of 4 hours. After addition, each 0.2 part of benzoyl peroxide was three times added at intervals of 1 hour, and the mixture was kept at 100° C. for 5 hours. The carboxylic acid amide copolymer 6 thus obtained was a transparent viscous liquid having a solid content of 50.7% and an acid number of 8.8.

Preparative Example 9

Preparation of Polyester Resin A 1,080 Parts of isophthalic acid, 511 parts of adipic acid, 832 parts of neopentyl glycol and 536 parts of trimethylolpropane were charged into a reaction vessel equipped with a stirrer, a thermometer and a nitrogen gas inlet tube, and reacted at 220° C. while flowing nitrogen until the acid number of the mixture reached 8. After cooling the reaction vessel, the mixture was diluted with a solvent mixture comprising n-butanol, butyl acetate and xylene (20/10/70, ratio by weight) so that the concentration of the solid component became 50%. The polyester resin A thus obtained was a transparent liquid having an acid number of 4.0.

Preparative Example 10

Preparation of Polyester Resin B 1,112 Parts of isophthalic acid, 482 parts of adipic acid, 728 parts of neopentyl glycol, 90 parts of 1,4-butanediol and 536 parts of trimethylolpropane were charged into the same reaction vessel as above, and reacted at 220° C. while blowing nitrogen until acid number of the mixture reached 9. After cooling the reaction vessel, the mixture was diluted with a solvent mixture comprising n-butanol, butyl acetate and xylene (20/10/70, ratio by weight) so that the concentration of the solid component became 50%. The polyester resin B thus obtained was a transparent liquid having an acid number of 4.5.

Preparative Example 11

Preparation of Thermosetting Acrylic Powder Coating Material A

A monomer mixture comprising 20 parts of methyl methacrylate, 20 parts of n-butyl methacrylate, 30 parts of styrene, 5 parts of n-butyl acrylate, 5 parts of hydroxyethyl acrylate and 20 parts of glycidyl methacrylate was copolymerized to obtain a solid copolymer resin having a weight average molecular weight of 10,000. Its 90 parts was melt-blended with 10 parts of sebacic acid by means of an extruder, after which the mixture was cooled and pulverized. The powdery particles passing 200 mesh sieve were collected to obtain acrylic powder coating material A.

Preparative Example 12

Preparation of Thermosetting Acrylic Powder Coating Material B

A monomer mixture comprising 30 parts of styrene, 20 parts of methyl methacrylate, 10 parts of ethyl acrylate, 20 parts of n-butyl acrylate and 25 parts of hydroxyethyl methacrylate was copolymerized to obtain a solid copolymer resin having a weight average molecular weight of 12,000. Its 65 parts was melt-blended with 35 parts of Adduct B-1870 (block isocyanate type of curing agent) and 1 part of Modaflow (manufactured by Monsanto Co.) by means of an extruder, and then the mixture was cooled and pulverized. The powdery particles passing 200 mesh sieve were collected to obtain acrylic powder coating material B.

Preparative Example 13

Preparation of Acrylic Copolymer A

Into a reactor equipped with a stirrer, a thermometer and a condenser were charged 20 parts of n-butanol and 80 parts of xylene, and the temperature of the contents was elevated to 100° C. To the reactor was thereafter added a mixture consisting of 8 parts of 2-hydroxyethyl methacrylate, 2 parts of methacrylic acid, 45 parts of methyl methacrylate, 45 parts of ethyl acrylate, and 1 part of benzoyl peroxide over 4 hours. After the completion of the addition, 0.2 part-portions of benzoyl peroxide were added three times every one hour, and the resulting mixture was then kept at 100° C. for 5 hours. The acrylic copolymer A thus obtained was a transparent, viscous liquid, and had a solid content of 50.1% and an acid value of 6.5.

EXAMPLE 1

Using carboxylic acid amide copolymer 1, a base coating material having the following formulation was prepared:

| | |
|---|---|
| Carboxylic acid amide copolymer 1 | 54 parts |
| 15% Solution of EAB-551-02* in | |
| Cellosolve acetate | 20 parts |
| Alpaste #1109 MA** | 8 parts |
| Colofine blue #720*** | 2 parts |

*Cellulose acetate butyrate resin manufactured by Eastman Kodak Co.
**Aluminum paste manufactured by Toyo Aluminium K.K.
***Organic pigment manufactured by Dainippon Ink Kagaku K.K.

The above-mentioned coating material was diluted with a solvent mixture comprising toluene, butyl acetate and Solvesso #150 (50/40/10, ratio by weight) and adjusted to 13 seconds as measured with Fc #4 (25° C.). This base coating material was applied to a surface-treated steel board (JIS G-3310 steel board chemically treated with zinc phosphate system) coated with an automobile cationic electrodeposition coating primer so as to give a dry coating thickness of 20μ, after which it was set for 5 minutes. Then, thermosetting acrylic powder coating material A was coated on the wet coating film so as to give a film thickness of 80μ and baked at 170° C. for 30 minutes. The coating film thus obtained was quite excellent in the finished appearance, good in coating film performances such as solvent resistance, water resistance, weather resistance, etc. as indicated in Table 1, and useful as an overcoating film for automobiles.

EXAMPLE 2

Using carboxylic acid amide copolymer 2, a base coating material having the following formulation was prepared:

| Carboxylic acid amide copolymer 2 | 54 parts |
|---|---|
| 15% Solution of EAB-551-02 in Cellosolve acetate | 20 parts |
| Alpaste #1109 MA | 8 parts |
| Colofine blue #720 | 2 parts |

The above-mentioned coating material was diluted with a solvent mixture comprising toluene, butyl acetate and Solvesso #150 (50/40/10, ratio by weight) and adjusted to 13 seconds as measured with Fc #4 (25° C.).

The base coating material thus obtained was applied to a surface-treated steel board (JIS G-3310 steel board chemically treated with zinc phosphate system) coated with an automobile cationic electrodeposition coating primer so as to give a dry film thickness of 20μ and then set for 5 minutes. Then, thermosetting acrylic powder coating material A was coated onto the wet coating film so as to give a film thickness of 80μ and baked at 170° C. for 30 minutes. The coating film thus obtained was excellent in finished appearance, good in coating film performances such as solvent resistance, water resistance, weather resistance, etc. as indicated in Table 1, and useful as an overcoating film for automobiles.

EXAMPLE 3

Using carboxylic acid amide copolymer 3, a base coating material having the following formulation was prepared:

| Carboxylic acid amide copolymer 3 | 54 parts |
|---|---|
| 15% Solution of EAB-551-02 in Cellosolve acetate | 20 parts |
| Alpaste #1109 MA | 8 parts |
| Colofine blue #720 | 2 parts |

The above-mentioned coating material was diluted with a solvent mixture comprising toluene, butyl acetate and Solvesso #150 (50/40/10, ratio by weight) and adjusted to 13 seconds as measured with Fc #4 (25° C.).

The base coating material thus obtained was applied to a surface-treated steel board (JIS G-3310 steel board chemically treated with zinc phosphate system) coated with an automobile cationic electrodeposition coating primer so as to give a dry film thickness of 20μ and then set for 5 minutes. Subsequently, thermosetting acrylic powder coating material A was coated onto the wet coating film so as to give a film thickness of 80μ and baked at 170° C. for 30 minutes. The coating film thus obtained was excellent in finished appearance and adhesion to the electrodeposition coated steel board, good in coating film performances such as solvent resistance, water resistance, weather resistance, etc. as indicated in Table 1, and useful as an overcoating for automobiles.

Further, in order to evaluate the coating film performances given by low temperature baking, the thermosetting acrylic powder coating material A as the clear coating material was replaced with a clear coating material obtained by blending Dianal HR-538 (usual acryl-melamine crosslinkable solvent type resin manufactured by Mitsubishi Rayon K.K., solid content 50%) with Uban 20 SE (melamine resin manufactured by Mitsui-Toatsu Kagaku K.K., solid content 60%) at an acryl (solid)/melamine (solid) ratio of 70/30 and diluting the blended mixture with Supersol #1500 (manufactured by Mitsubishi Sekiyu K.K.) as a thinner so as to give the appointed viscosity. Thus, after applying the base coating material of this invention and setting it for 3 minutes, said clear coating material was coated thereon by wet-on-wet method so as to give a dry film thickness of 3μ and baked at 140° C. for 30 minutes. The coating film thus obtained had good finished appearance, solvent resistance and weather resistance and was useful as an overcoating film for automobiles.

EXAMPLE 4

Using carboxylic acid amide copolymer 4, a base coating material having the following formulation was prepared:

| Carboxylic acid amide copolymer 4 | 54 parts |
|---|---|
| Sumimal M-504C* | 2 parts |
| 15% Solution of EAB-551-02 in Cellosolve acetate | 20 parts |
| Alpaste #1109 MA | 8 parts |
| Colofine blue #720 | 2 parts |

*Methylated melamine resin manufactured by Sumitomo Kagaku K.K. (68% solution)

The above-mentioned coating material was diluted with a solvent mixture comprising toluene, butyl acetate and Solvesso #150 (50/40/10, ratio by weight) and adjusted to 13 seconds as measured with Fc #4 (25° C.). The base coating material thus obtained was applied to a surface-treated steel board (JIS G-3310 steel board chemically treated with zinc phosphate system) coated with an automobile cationic electrodeposition coating primer so as to give a dry film thickness of 20μ and set for 5 minutes, after which thermosetting acrylic powder coating material A was coated on the wet coating film so as to give a film thickness of 80μ and baked at 170° C. for 30 minutes. The coating film thus obtained was excellent in finished appearance and adhesion to the electrodeposition coated board, good in coating film performances such as solvent resistance, water resistance, weather resistance, etc. as indicated in Table 1, and useful as an overcoating film for automobiles.

In order to evaluate its coating film performances given by low temperature baking, the thermosetting acrylic powder coating material A was replaced with a clear coating material obtained by blending Dianal HR-538 with Uban 20 SE at an acryl (solid)/melamine (solid) ratio of 70/30 and diluting the blended mixture with Supersol #1500 as a thinner so as to give the appointed viscosity. Thus, after applying the base coating material of this invention and setting it for 3 minutes, said clear coating material was coated thereon by wet-on-wet method so as to give a dry film thickness of 30μ and baked at 140° C. for 30 minutes. The coating film thus obtained had good finished appearance, solvent resistance and weather resistance and was useful as an overcoating film for automobiles.

EXAMPLE 5

Using carboxylic acid amide copolymer 5, a base coating material having the following formulation was prepared:

| | |
|---|---|
| Carboxylic acid amide copolymer 5 | 54 parts |
| 15% Solution of EAB-551-02 in | |
| Cellosolve acetate | 20 parts |
| Alpaste #1109 MA | 8 parts |
| Colofine blue #720 | 2 parts |

The above-mentioned coating material was diluted with a solvent mixture of toluene, butyl acetate and Solvesso #150 (50/40/10, ratio by weight) and adjusted to 13 seconds as measured with Fc #4 (25° C.). The above-mentioned base coating material A was applied to a surface-treated steel board (JIS G-3310 steel board chemically treated with zinc phosphate system) coated with an automobile cationic electrodeposition coating primer so as to give a dry film thickness of 20μ and set for 5 minutes, after which thermosetting acrylic powder coating material A was coated on the wet coating film so as to give a dry film thickness of 80μ and baked at 170° C. for 30 minutes. The coating film thus obtained was excellent in finished appearance, good in coating film performances such as solvent resistance, water resistance, weather resistance, etc. as indicated in Table 1, and useful as an overcoating film for automobiles.

In order to evaluate its coating film performances given by low temperature baking, the thermosetting acrylic powder coating material A was replaced with a clear coating material obtained by blending Dianal HR-538 with Uban 20 SE at an acryl (solid)/melamine (solid) ratio of 70/30 and diluting the blended mixture with Supersol #1500 as a thinner so as to give a viscosity of 30 seconds as measured with Fc #4 (25° C.). Thus, after applying the base coating material of this invention so as to give a dry film thickness of 20μ and setting it for 3 minutes, said clear coating material was coated thereon by wet-on-wet method so as to give a dry film thickness of 30μ and baked at 140° C. for 30 minutes. The coating film thus obtained had good finished appearance, solvent resistance and weather resistance and was useful as an overcoating film for automobiles.

EXAMPLE 6

Using carboxylic acid amide copolymer 6, a base coating material having the following formulation was prepared:

| | |
|---|---|
| Carboxylic acid amide copolymer 6 | 57 parts |
| 15% Solution of EAB-551-02 in | |
| Cellosolve acetate | 10 parts |
| Alpaste #1109 MA | 10 parts |

An overcoating film for automobiles was prepared by repeating the procedure of Example 5, except that the base coating material used in Example 5 was replaced with the above-mentioned base coating material. The coating film thus obtained was free from defects in coating film such as pin hole, yellowing, marked orange peel and the like and good in metallic feeling and sharpness. The coating film was also good in coating film performances, such as solvent resistance, water resistance, weather resistance, etc. as indicated in Table 1.

Further, in order to evaluate the performances in case of repair, the above-mentioned 2-coat 1-bake board was partially overcoated again with the base coating material of this invention and the thermosetting acrylic powder coating material A and baked at 170° C. for 30 minutes. As the result, there was formed a coating film in which the part again coated and baked was not greatly different in finished appearance from the other part. The adhesion between these coating films were also good.

EXAMPLE 7

Using carboxylic acid amide copolymer 1, a base coating material having the following formulation was prepared:

| | |
|---|---|
| Carboxylic acid amide copolymer 1 | 48 parts |
| Polyester resin A | 6 parts |
| 15% Solution of EAB-551-02 in | |
| Cellosolve acetate | 20 parts |
| Alpaste #1109 MA | 8 parts |
| Colofine blue #720 | 2 parts |

The above-mentioned coating material was diluted with a solvent mixture comprising toluene, butyl acetate and Solvesso #150 (50/40/10, ratio by weight) and adjusted to 13 seconds as measured with Fc #4 (25° C.).

The base coating material thus obtained was applied to a surface-treated steel board (JIS G-3310 steel board chemically treated with zinc phosphate system) coated with an automobile cationic electrodeposition coating primer so as to give a dry film thickness of 20μ and set for 5 minutes. Then, thermosetting acrylic powder coating material A was coated on the wet coating film so as to give a film thickness of 80μ and baked at 170° C. for 30 minutes. The coating film thus obtained was excellent in finished appearance, good in coating film performances such as solvent resistance, water resistance, weather resistance, etc. as indicated in Table 1, and useful as an overcoating film for automobiles.

Further, in order to evaluate the performances in case of repair, the above-mentioned 2-coat 1-bake board was partially coated again with the base coating material and thermosetting acrylic powder coating material A and baked at 170° C. for 30 minutes.

As a result, the part again coated and baked was not greatly different from the other part in finished appearance, and there was formed a coating film having a good finished appearance. The adhesion between these coating films was also good.

EXAMPLE 8

Using carboxylic acid amide copolymer 4 and polyester resin B, a base coating material having the following formulation was prepared:

| | |
|---|---|
| Carboxylic acid amide copolymer 4 | 48 parts |
| Polyester resin B | 9 parts |
| Sumimal M-504C | 2 parts |
| 15% Solution of EAB-551-02 in | |
| Cellosolve acetate | 10 parts |
| Alpaste #1109 MA | 10 parts |

The above-mentioned base coating material was diluted in the same manner as in Example 7, applied to the same surface-treated steel board coated with an electrodeposition coating primer as used in Example 7 according to the coating process of Example 1 so as to give a dry film thickness of 20μ and set for 5 minutes. Then, thermosetting acrylic powder coating material A was coated thereon so as to give a dry film thickness of 80μ and baked at 170° C. for 30 minutes. The coating film thus obtained was free from defects in coating film such as pin hole, yellowing, marked orange peel, etc. and good in metallic feeling and sharpness. The coating film was also good in coating film performances, such as solvent resistance, water resistance, weather resistance, etc. as indicated in Table 1.

Further, in order to evaluate its performances in case of low temperature baking, the thermosetting acrylic powder coating material A as a clear coating material was replaced with a clear coating material obtained by blending Dianal HR-538 with Uban 20 SE at an acryl (solid)/melamine (solid) ratio of 70/30 and diluting the blended mixture with Supersol #1500 so as to give an appointed viscosity. Thus, after applying the base coating material of this invention and setting it for 3 minutes, said clear coating material was coated by wet-on-wet method so as to give a dry film thickness of 30μ and baked at 140° C. for 30 minutes. The coating film thus obtained had good finished appearance, solvent resistance and weather resistance and was useful as an overcoating film for automobiles.

EXAMPLE 9

A coating film similar to that of Example 8 was prepared by using thermosetting acrylic powder coating material B in place of the thermosetting acrylic powder coating material A of Example 8.

The coating film thus obtained was good in finished appearance and other coating film performances, similarly to that of Example 8, as indicated in Table 1.

EXAMPLE 10

Using carboxylic acid amide copolymer 2 and polyester resin A, a base coating material having the following formulation was prepared:

| | |
|---|---|
| Carboxylic acid amide copolymer 2 | 42 parts |
| Polyester resin A | 12 parts |
| 15% Solution of EAB-551-02 in Cellosolve acetate | 5 parts |
| Sumimal M-504C | 1.1 parts |
| Titanium oxide R-820* | 2 parts |
| Irgazin yellow 2GLT** | 4 parts |

*Pigment manufactured by Ishihara Sangyo K.K.
**Pigment manufactured by Ciba Geigy Co.

The above-mentioned coating material was diluted with a solvent mixture comprising Cellosolve acetate and toluene (20/80, ratio by weight) to 18 seconds as measured with Fe #4 (25° C.).

The base coating material thus obtained was applied to the same surface-treated steel board coated with an electrodeposition coating primer as used in Example 1 so as to give a dry film thickness of 20μ and set for 5 minutes. Then, thermosetting acrylic powder coating material A was coated thereon so as to give a dry film thickness of 80μ and baked at 170° C. for 30 minutes. The coating film thus obtained had excellent finished appearance and sharpness and was good in coating film performances, such as solvent resistance, water resistance, weather resistance, etc. as indicated in Table 1, and useful as a solid color coating film for automobiles.

The above-mentioned base coating material had a good pigment dispersibility, a good pulverizability at the time of coating and a good coating workability.

Comparative Example 1

In place of the base coating material of Example 1, a base coating material having the following formulation was prepared:

| | |
|---|---|
| Dianal HR-560 (manufactured by Mitsubishi Rayon K.K., solid content 50%) | 42 parts |
| Uban 20 SE | 15 parts |
| Alpaste #1190 MA | 8 parts |
| Colofine blue #720 | 2 parts |

Then, a 2-coat 1-bake coating film was prepared from the above-mentioned base coating material by carrying out coating and baking in the same manner as in Example 1. The coating film thus obtained had a bad appearance with occurrence of metallic unevenness and pin hole as indicated in Table 1.

Comparative Example 2

In place of the base coating material of Example 1, a base coating material having the following formulation was prepared:

| | |
|---|---|
| Acrylic copolymer A (50% solid content) | 42 parts |
| Uban 20 SE | 15 parts |
| 15% Solution of EAB-551-02 in Cellosolve acetate | 20 parts |
| Alpaste #1190 MA | 8 parts |
| Colofine blue #720 | 2 parts |

Then, a 2-coat 1-bake coating film was prepared from the above-mentioned base coating material by carrying out coating and baking in the same manner as in Example 1. The coating film thus obtained had pin holes and bad finished appearance.

Comparative Example 3

In place of the base coating material of Example 1, a base coating material having the following formulation was prepared:

| | |
|---|---|
| Acrylic copolymer A (5% solid content) | 54 parts |
| 15% Solution of EAB-551-02 in Cellosolve acetate | 20 parts |
| Alpaste #1109 MA | 8 parts |
| Colofine blue #720 | 2 parts |

Then, a 2-coat 1-bake coating film was prepared from the above-mentioned based coating material by carrying out coating and baking in the same manner as in Example 1. The coating film thus obtained had a good finished appearance but was remarkably inferior in solvent resistance, water resistance and the like as indicated in Table 1.

TABLE 1

Result of Estimation of Coating Workability and Coating Film Performances

| Item | Example 1 | 2 | 3 | 4 | 5 | 6 | 7 | 8 | 9 | 10 | Comparative Example 1 | 2 | 3 |
|---|---|---|---|---|---|---|---|---|---|---|---|---|---|
| Finished appearance | ○ | ○ | ○ | ○ | ◎ | ◎ | ◎ | ◎ | ◎ | ◎ | x | x | ◎ |
| Flexibility | ○ | ○ | ○ | ○ | ○ | ○ | ○ | ○ | ○ | ○ | ○ | ○ | Δ |
| Solvent resistance | ○ | ○ | ◎ | ◎ | ◎ | ◎ | ◎ | ◎ | ◎ | ◎ | ◎ | ◎ | x |
| Water resistance | ○ | ○ | ○ | ○ | ○ | ○ | ○ | ○ | ○ | ○ | ○ | ○ | x |
| Adhesion to primer | ○ | ○ | ◎ | ◎ | ○ | ○ | ○ | ◎ | ◎ | ○ | ○ | ○ | Δ |

Note:
◎: Excellent
○: Good
Δ: Poor
x: Bad

Method of estimation
Finished appearance: Judged based on pin hole, orientation of metallic powder and the like.
Flexibility: Judged by Erichsen test
Solvent resistance: Judged by gasoline dipping test (dipped at 20° C. for 24 hrs.)
Water resistance: Judged by hot water dipping test (dipped at 80° C. for 48 hrs.)
Adhesion to primer: Judged by chipping test.

What is claimed is:

1. A process for forming a coating film comprising coating, onto a substrate, a solvent type coating material prepared by blending a color pigment or combination of a metallic powder and a color pigment into a base resin containing a carboxylic acid amide copolymer as the main component, and 1-20 parts by weight of cellulose acetate butyrate resin per 100 parts by weight of the carboxylic acid amide copolymer, then coating a transparent thermosetting powder coating material thereon, and thereafter heating and curing them, wherein said carboxylic acid amide copolymer is one selected from the group consisting of: (A) a copolymer comprising 2-20% by weight of α,β-monoethylenic unsaturated carboxylic acid amide, 0.5-10% by weight of an α,β-unsaturated carboxylic acid having one or more carboxyl groups, 5-30% by weight of an unsaturated polyester resin and 92.5-40% by weight of other copolymerizable monomer, one hydrogen atom in its amide group being substituted by a group represented by the following formula:

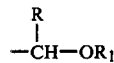

wherein R represents hydrogen atom or alkyl group and $R_1$ represents hydrogen atom or organic group; and (B) a copolymer comprising 4-40% by weight of N-alkoxyalkyl-substituted amide represented by the following formula:

wherein $R_2$ is aliphatic hydrocarbon group having 2-6 carbon atoms and a single, polymerizable, α,β-ethylenic, unsaturated terminal group and $R_3$ represents lower alkyl group having 1-8 carbon atoms, 0.5-10% by weight of an α,β-unsaturated carboxylic acid having one or more carboxylic groups, 5-30% by weight of an unsaturated polyester resin and 90.5-20% by weight of other copolymerizable unsaturated monomer.

2. A process according to claim 1, wherein said base resin comprises 30-94 parts by weight of a carboxylic acid amide copolymer, 5-30 parts by weight of a polyester resin, 1-20 parts by weight of a cellulose acetate butyrate resin and 0-20 parts by weight of an amino resin.

3. A metallic board characterized by being coated with a coating film obtained according to the process of claim 1.

* * * * *